(12) United States Patent
Arrell et al.

(10) Patent No.: US 7,950,146 B2
(45) Date of Patent: *May 31, 2011

(54) CO-FORGED STEEL ROTOR COMPONENT FOR STEAM AND GAS TURBINE ENGINES

(75) Inventors: Douglas J. Arrell, Oviedo, FL (US); Allister W. James, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/784,988

(22) Filed: Apr. 10, 2007

(65) Prior Publication Data

US 2008/0253894 A1    Oct. 16, 2008

(51) Int. Cl.
*F01D 5/02* (2006.01)
*F01D 5/34* (2006.01)

(52) U.S. Cl. .............. 29/889.2; 416/244 A; 416/204 A; 29/889.21

(58) Field of Classification Search .................. 415/112; 416/203, 204 A, 213 R, 244 A, 244 R, 216.1; 29/889.2, 889.21, 447
See application file for complete search history.

(56) References Cited

U.S. PATENT DOCUMENTS

| | | | |
|---|---|---|---|
| 3,822,953 A * | 7/1974 | Adelizzi | 403/356 |
| 3,967,919 A | 7/1976 | Coulon et al. | |
| 4,270,256 A | 6/1981 | Ewing | |
| 4,566,810 A | 1/1986 | Yoshioka et al. | |
| 4,615,658 A * | 10/1986 | Kagohara et al. | 415/178 |
| 4,710,103 A * | 12/1987 | Faber et al. | 416/219 R |
| 4,778,345 A | 10/1988 | Ito et al. | |
| 4,836,750 A * | 6/1989 | Modafferi et al. | 416/244 A |
| 4,962,586 A | 10/1990 | Clark et al. | |
| 5,161,950 A * | 11/1992 | Krueger et al. | 416/204 R |
| 5,746,579 A * | 5/1998 | Amos et al. | 416/204 A |
| 6,152,697 A | 11/2000 | Konishi et al. | |
| 6,324,831 B1 | 12/2001 | Izadi et al. | |
| 6,454,531 B1 | 9/2002 | Crawmer | |
| 6,575,700 B2 | 6/2003 | Arai et al. | |
| 6,753,504 B2 | 6/2004 | Keller et al. | |
| 6,767,649 B2 | 7/2004 | Staubli et al. | |
| 7,065,872 B2 | 6/2006 | Ganesh et al. | |
| 7,108,483 B2 | 9/2006 | Segletes et al. | |
| 7,137,787 B2 | 11/2006 | James | |
| 2003/0116549 A1 | 6/2003 | Vanstone et al. | |
| 2005/0106012 A1 | 5/2005 | Scarlin | |
| 2006/0067832 A1 * | 3/2006 | Groh et al. | 416/244 A |
| 2006/0118215 A1 | 6/2006 | Hirakawa et al. | |
| 2008/0253890 A1 * | 10/2008 | Arrell et al. | 416/95 |

FOREIGN PATENT DOCUMENTS

JP    58130256 A *    8/1983

* cited by examiner

*Primary Examiner* — Edward Look
*Assistant Examiner* — Jesse Prager

(57) ABSTRACT

A method of forming a rotor for a turbine engine such that the rotor is formed of two materials including: an outer ring formed from a first steel material, and a disk formed from a second material, such as a low alloy steel, having a larger thermal expansion coefficient than the first material forming the inner disk. The ring may include an inner aperture having a conical shape, and the disk may have an outer surface with a conical shape and a diameter with a portion that is larger than a portion of the ring. The ring may be heated such that the aperture expands to a size greater than the largest diameter of the inner disk. The ring may be positioned over the disk and allowed to cool to allow the ring to be attached to the disk. The ring and disk may then be co-forged.

10 Claims, 4 Drawing Sheets

CO-FORGED STEEL ROTOR COMPONENT FOR STEAM AND GAS TURBINE ENGINES

FIELD OF THE INVENTION

This invention is directed generally to turbine engines, and more particularly to rotors usable in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies and turbine rotors to these high temperatures. As a result, turbine rotors must be made of materials capable of withstanding such high temperatures. Steel rotors have begun to be changed to nickel-based alloys to compensate for these high temperatures. However, rotors are large components and forming the rotors entirely of nickel-based alloys is expensive. Thus, a need exists for a more cost efficient turbine rotor having superior thermal properties.

Modern steam turbines currently operate without cooling at temperatures close to, or even exceeding 600° C. These are almost exclusively manufactured from ferritic steels. However, the maximum temperature at which these steam turbines can operate is close to that at which the steam turbine operates. The ferritic steels capable of being used at highest operating temperatures have poorer low temperature capabilities, thus it is desirable to be able to produce rotors which allow the rotor mechanical behavior to be optimal at all temperatures.

SUMMARY OF THE INVENTION

This invention is directed to a turbine rotor system for forming a turbine rotor that is usable in a turbine engine. The turbine rotor may be formed from two or more different steel materials such that the steel material exposed to the hot gas path has superior thermal properties and resistance to the high temperatures found in the hot gas path of a turbine engine. In at least one embodiment, the steel material forming the outer aspect of the turbine rotor may have increased thermal properties for more effectively handling exposure to the high temperatures of the gases in the hot gas path.

The turbine rotor system may include a method of forming a turbine rotor usable in a turbine engine including positioning an outer ring formed from a first heat resistant steel with a first thermal expansion coefficient and including an inner aperture having a first changing diameter proximate to a disk formed from a second low alloy steel with a second thermal expansion coefficient less than the first thermal expansion coefficient with an outer changing diameter that includes at least a portion of the outer changing diameter that is greater than a portion of the first changing diameter of the inner aperture of the ring, thereby forming an interference fit.

An outer surface of the outer changing diameter of the disk may be generally conical shaped and an inner surface of the first changing diameter of the ring may be generally conical shaped. The ring may be heated such that the first changing diameter may grow to be larger than the outer changing diameter of the disk due to thermal expansion. The ring may then be placed around the disk such that the outer surfaces of the ring and disk are substantially flush with each other. The ring may be allowed to cool such that the inner surface of the inner aperture of the ring contacts the outer surface of the disk. The ring and disk may then be co-forged together.

The ring may be formed from a first heat resistant steel material, such as, but not limited to, a tempered martensitic steel, an austenitic steel or other appropriate material. The disk may be formed from less costly materials, such as, but not limited to, a low alloy steel. In another embodiment, the ring need not be heated by itself. Rather, the ring and disk may be heated together such that the thermal expansion of the ring exceeds the thermal expansion of the disk. In another embodiment, the ring and disk may be keyed to prevent decoupling during the forging process. The inner aperture of the ring may include a key, and the outer changing diameter of the disk may include a keyway sized to receive the key. In an alternative embodiment, the outer changing diameter of the disk may include a key, and the inner aperture of the ring may include a keyway sized to receive the key.

An advantage of this invention is that a rotor may be formed from two or more steel materials such that outer aspects of the rotor may be formed from a steel material having superior thermal properties and inner aspects of the rotor may be formed from less expensive steel materials. The low temperature mechanical properties of the inner disk are often superior to those of the outer disk, thus providing enhanced benefit beyond the lower cost of the steel.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
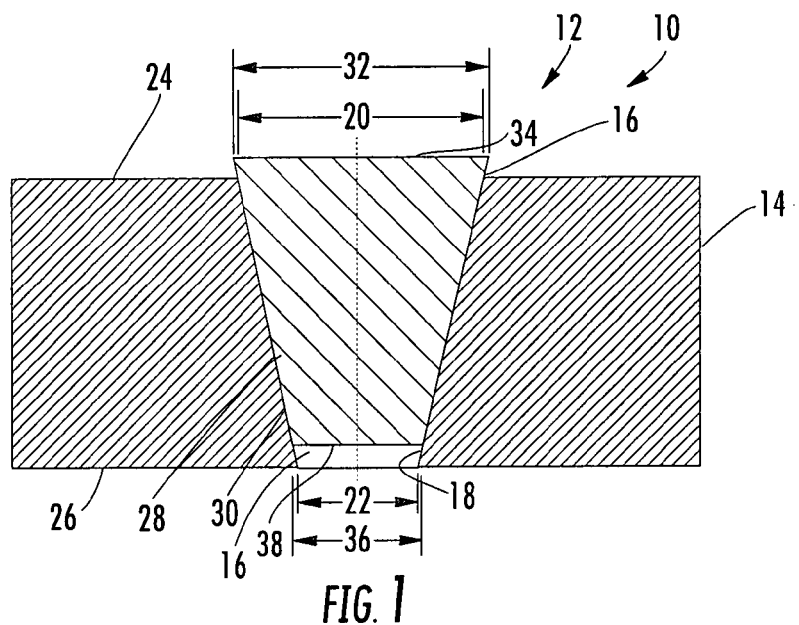
FIG. 1 is a cross-sectional view of a partially formed airfoil rotor for a turbine engine in which the rotor is formed from an outer ring surrounding an inner steel disk before being heated.

As shown in FIGS. 1-6, this invention is directed to a turbine rotor system 10 for forming a turbine rotor 12 that is usable in a turbine engine. The turbine rotor 12 may be formed from two or more steel materials, each with different properties, such that the steel material exposed to the hot gas path has increased resistance to the high temperatures found in the hot gas path. In at least one embodiment, the steel material forming the outer aspect of the turbine rotor 12 may have increased thermal properties for more effectively handling exposure to the high temperatures of the gases in the hot gas path.

The turbine rotor system 10 may include an outer ring 14 formed from a first material, such as a first steel material, having a first coefficient of thermal expansion. The first steel material may be, but is not limited to, a tempered martensitic steel, an austenitic steel or other appropriate material. The outer ring 14 may include an inner aperture 16. The inner aperture 16 may have changing diameters such that a diameter of a portion of an inner surface 18 of the inner aperture 16 is less than diameters of other aspects of the inner surface 18. In one embodiment, the inner aperture 16 may have a generally conical shape with varying diameters including a first diameter 20 at a first side 24 and a second diameter 22 at a second side 26. The first diameter 20 may be the largest diameter of the inner aperture 16, and the second diameter 22 may be smallest diameter of the inner aperture 16. The first diameter 20 may be larger than the second diameter 22.

The turbine rotor system 10 may also include an inner disk 28. The inner disk 28 may be formed from a second steel material, such as a low alloy steel, having sufficient thermal characteristics to handle exposure to the high temperatures, but not necessarily those of the hot gas path, yet be less costly than the materials forming the ring 14. The disk 28 may include an outer surface 30 configured to engage the inner surface 18 of the aperture 16. The outer surface 30 may have a changing diameter across the disk 28. In one embodiment, the outer surface 20 may have a generally conical shape that corresponds with the inner aperture 16 such that each surface is positioned at the same angle thereby allowing the surfaces to mate with each other. The outer surface 20 may include a third diameter 32 at a third side 34 having the largest diameter across the disk 28 and a fourth diameter 36 at a fourth surface 38 having the smallest diameter across the disk 28. The outer surface 20 may be sized such that the first diameter 20 of the ring 14 is less than the third diameter 32 of the disk 28. The outer surface 20 may also be sized such that the second diameter 22 of the ring 14 is less than the fourth diameter 36 of the disk 28. In addition, the first diameter 20 of the ring 14 may be greater than the fourth diameter 36 of the disk 28.

Figure 2:
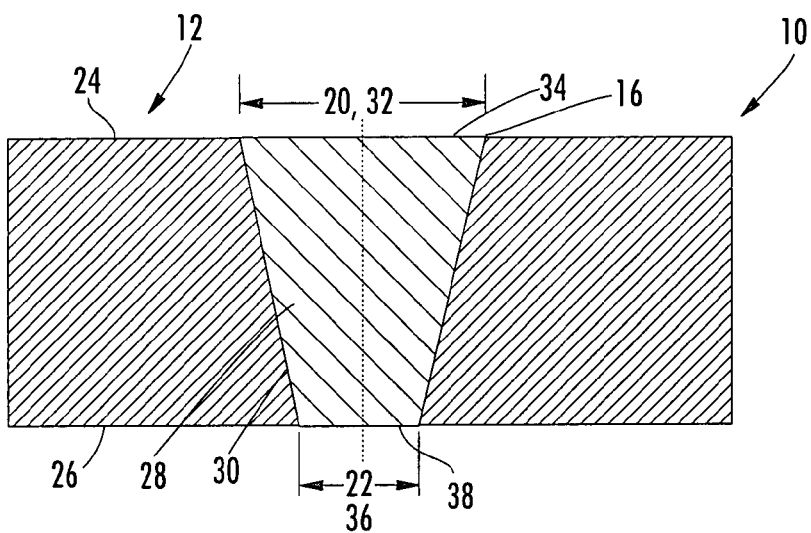
FIG. 2 is a cross-sectional view of a partially formed airfoil rotor for a turbine engine in which the rotor is formed from an outer ring surrounding an inner steel disk after being heated.
Figure 3:
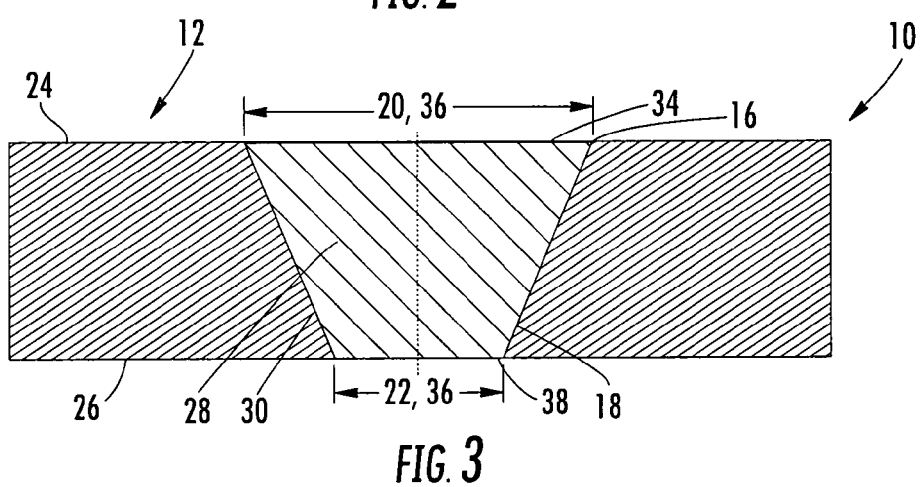
FIG. 3 is a cross-sectional view of a partially formed airfoil rotor for a turbine engine in which the rotor is formed from an outer ring surrounding an inner steel disk after being heated and forged.

The ring 14 and disk 28 may be attached together by first placing the disk 28 into the inner aperture 16 so that the first and third sides 24, 34 are proximate to each other yet not flush with each other and the second and fourth sides 26, 38 are proximate to each other yet not flush with each other. As shown in FIG. 1, the first and third sides 24, 34 are nearly coplanar with each other, and the second and fourth sides 26, 38 are nearly coplanar with each other as well. The ring 14 and disk 28 may then be attached to each other via thermal expansion. In one embodiment, the ring 14 may be heated to expand the size of the aperture 16 such that the first diameter 20 of the ring 14 is equal to or greater than the third diameter 32 of the disk 28, and the second diameter 22 is equal to or greater than the fourth diameter 36 of the disk 28. The disk 28 may then be positioned relative to the ring 14, as shown in FIG. 2, such that the first side 24 of the ring 14 is generally coplanar with the third side 34 of the disk 28, and the second side 26 of the ring 14 is generally coplanar with the fourth side 38 of the disk 28. In another embodiment, both the ring 14 and the disk 28 may be heated together in embodiments where the thermal coefficient of the ring 14 exceeds the thermal coefficient of the disk 28, such as in embodiments in which the ring is formed from a nickel alloy and the disk is formed from steel. These processes may be repeated to add additional rings. The ring 14 and disk 28 may be co-forged to produce the final turbine rotor 12, as shown in FIG. 3. The overall outer diameter of the outer ring 14 increases as well as the diameters 20, 22, 32 and 36. The forging process may be one of the conventional forging processes regularly used for the production of turbine disks. Examples include open die forging, closed die forging and isothermal forging. In another embodiment, the step of co-forging the material together may occur when the components are heated together. In particular, the conical shape of the outer surface 30 of the disk 28 may allow the disk 28 to slide into the outer ring 14 under the weight of the outer ring 14 alone when placed in a pre-forge furnace due to the differences in thermal expansion of the materials forming the ring 14 and disk 28.

Figure 4:
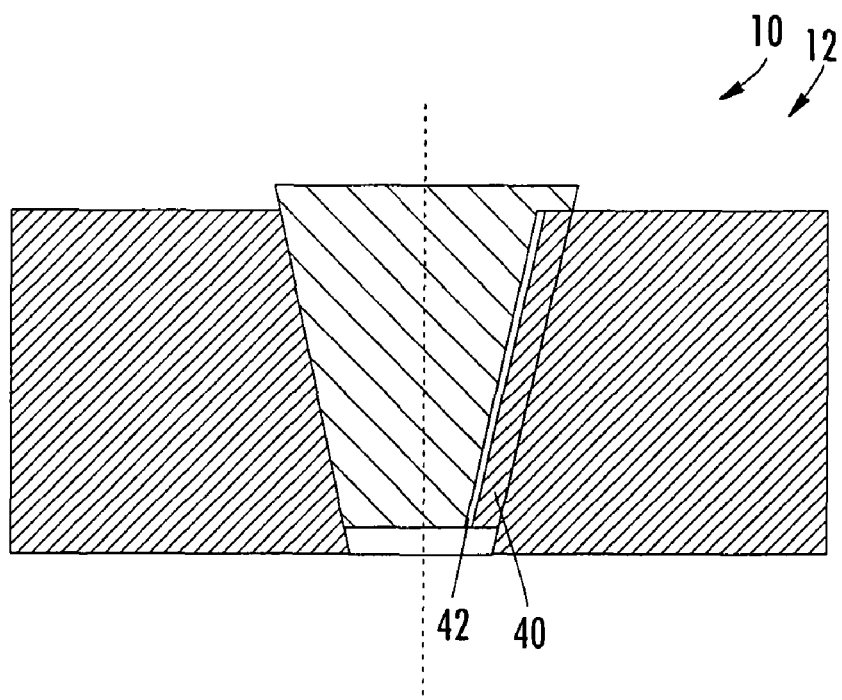
FIG. 4 is a cross-sectional view of an alternative embodiment of the rotor.
Figure 5:
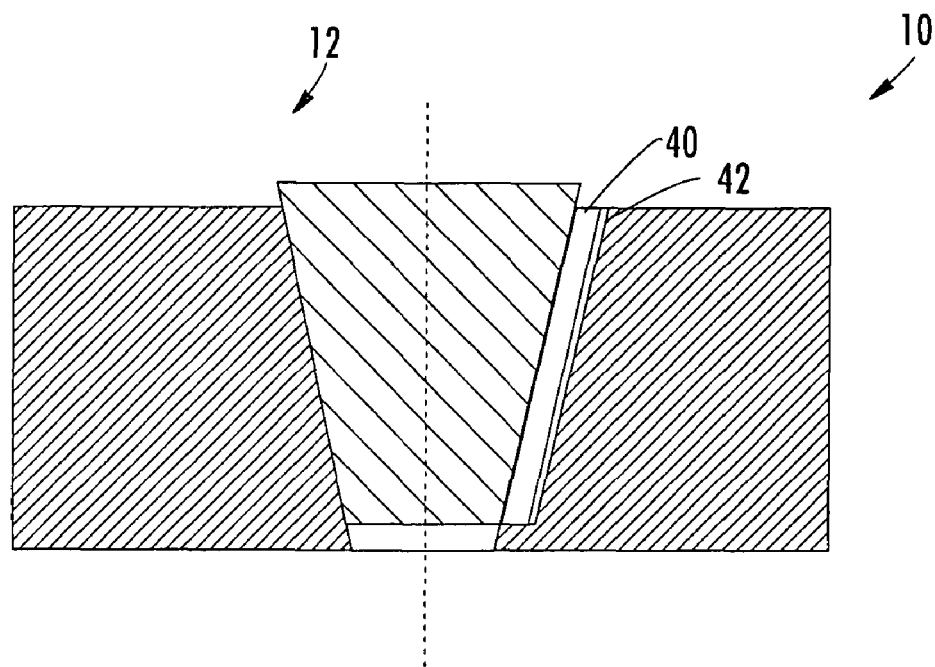
FIG. 5 is a cross-sectional view of another alternative embodiment of the rotor.

In another embodiment, the rotor system 10 may include additional devices to prevent decoupling during the forging process. In particular, as shown in FIG. 4, the inner aperture 16 of the ring 14 may include a key 40, and the outer surface 30 of the disk 28 may include a keyway 42 sized to receive the key 40. In an alternative embodiment, as shown in FIG. 5, the outer surface 30 of the disk 28 may include a key 40 and the inner aperture 16 of the ring 14 may include a keyway 42 sized to receive the key 40.

Figure 6:
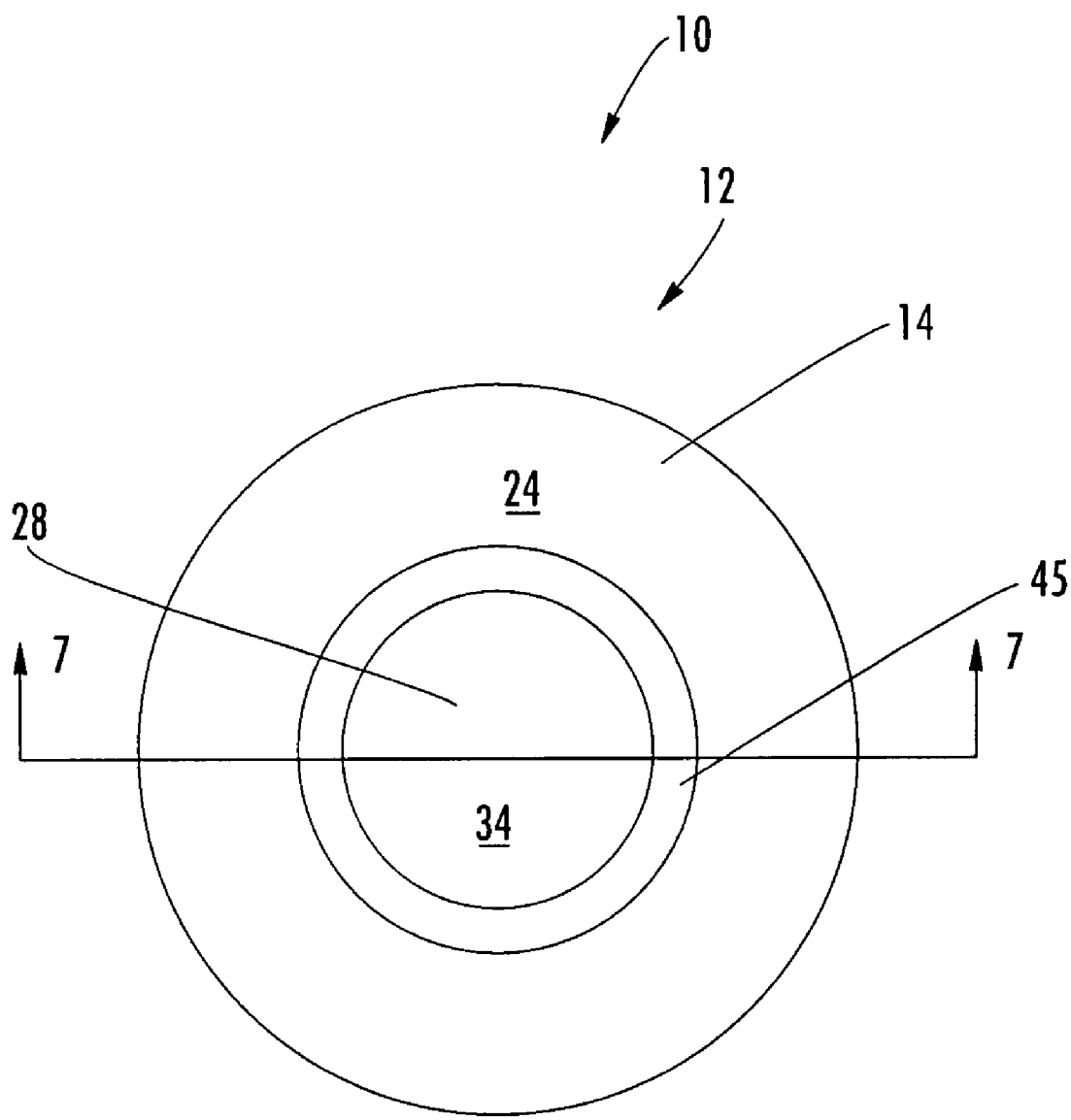
FIG. 6 is a top view of an alternative embodiment of the rotor with an intermediate ring positioned between the nickel alloy and the steel.
Figure 7:
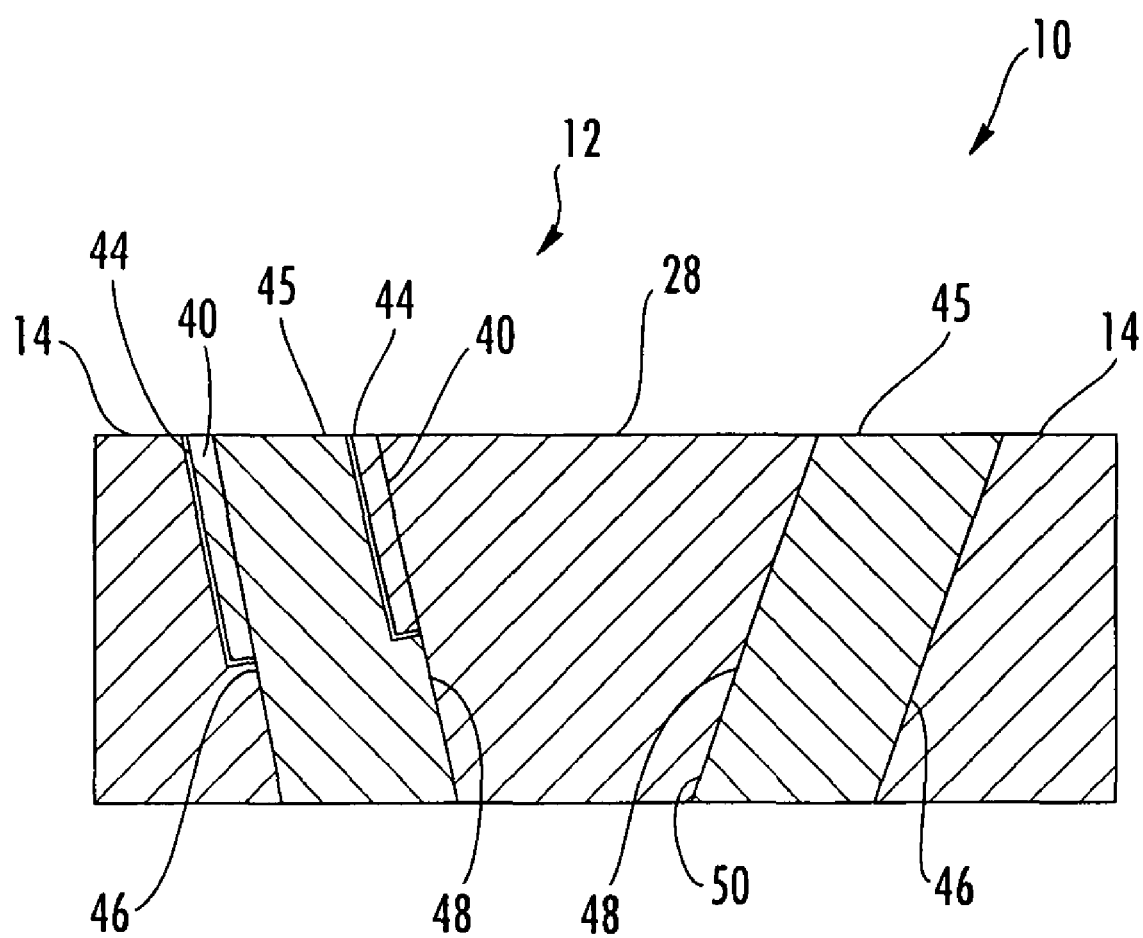
FIG. 7 is a cross-section view of the rotor taken at section line 7-7 in FIG. 6.

As shown in FIGS. 6 and 7, the turbine rotor 12 may be formed from a disk 28, an intermediate ring 45 and an outer ring 14. The intermediate ring 45 may be sized and configured as the outer ring 14 previously discussed. The intermediate ring 45 may include an outer conical surface 46 and an inner conical surface 48 in an aperture 50. The intermediate ring 45 may be attached to the disk 28 in the same manner as the outer ring may be attached to the disk 28, as previously discussed. The intermediate ring 45 may be formed from steel materials with properties between the steel forming the outer ring 14 and the low alloy steel forming the disk 28. The intermediate ring 45 may be capable of reducing the formation of detrimental phases due to diffusional interactions at the interface between the outer ring 14 and the disk 28. The intermediate ring 45 may be keyed with keys 40 and keyways 44 for preventing decoupling during the forging process.

EXAMPLE 1

The disk 28 may be formed from 2.25 Cr-1Mo steel, and the outer ring 14 may be formed from a SS 347 stainless steel.

EXAMPLE 2

The disk 28 may be formed from 2.25 Cr-1Mo steel. The intermediate ring 44 may be formed from a 3.5 NiCrMoV and the outer ring 14 may be formed from a P92 tempered martensitic steel.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of forming a turbine rotor usable in a turbine engine, comprising:

positioning an outer ring formed from a first heat resistant steel with a first thermal expansion coefficient and including an inner aperture having a first changing diameter proximate to a disk formed from a second low alloy steel with a second thermal expansion coefficient less than the first thermal expansion coefficient with an outer changing diameter that includes at least a portion of the outer changing diameter that is greater than a portion of the first changing diameter of the inner aperture of the ring;

wherein an outer surface of the outer changing diameter of the disk is generally conical shaped;

wherein an inner surface of the first changing diameter of the ring is generally conical shaped;

heating the ring such that the first changing diameter grows to be larger than the outer changing diameter of the disk due to thermal expansion;

placing the ring around the disk and allowing the ring to cool such that the inner surface of the inner aperture of the ring contacts the outer surface of the disk; and co-forging the ring and disk together.

2. The method of claim 1, wherein positioning the ring formed from the first heat resistant steel comprises positioning the ring formed from the first heat resistant steel, wherein the ring is formed from a tempered martensitic steel.

3. The method of claim 1, wherein positioning the ring formed from the first heat resistant steel comprises positioning the ring formed from the first heat resistant steel, wherein the ring is formed from an austenitic steel.

4. The method of claim 1, further comprising heating the ring and disk together such that the thermal expansion of the ring exceeds the thermal expansion of the disk.

5. The method of claim 1, wherein the ring and disk are keyed to prevent decoupling during the forging process.

6. The method of claim 5, wherein the inner aperture of the ring includes a key and the outer changing diameter of the disk includes a keyway sized to receive the key.

7. The method of claim 5, wherein the outer changing diameter of the disk includes a key and the inner aperture of the ring includes a keyway sized to receive the key.

8. The method of claim 1, further comprising positioning an intermediate ring between the disk and the outer ring.

9. A method of forming a turbine rotor usable in a turbine engine, comprising:

positioning an outer ring formed from a first steel material and including an inner aperture having a conical inner surface over an intermediate ring formed from a second steel material that is different from the first steel material and includes an outer conical surface and an inner aperture with a conical surface, such that the intermediate ring resides within the outer ring;

positioning the intermediate ring over a disk with an outer conical surface that includes at least a portion of the outer changing diameter that is greater than a portion of the first changing diameter of the inner aperture of the ring, such that the disk resides within the intermediate ring;

heating the outer ring, intermediate ring and disk together such that the size of the aperture in the outer ring thermally expands at a greater rate than the intermediate ring and the aperture in the intermediate ring expands at a greater rate then the disk;

allowing the outer ring and intermediate ring to cool such that the inner surface of the aperture of the outer ring contacts the intermediate ring, and the intermediate ring contacts the disk; and co-forging the outer ring, the intermediate ring and disk together.

10. The method of claim 9, wherein positioning the outer ring comprises aligning the outer ring with the intermediate ring to facilitate insertion of a key into a keyway and aligning the intermediate ring with the disk to facilitate insertion of key into a keyway to prevent decoupling during the forging process.

\* \* \* \* \*